(12) United States Patent
Curtis

(10) Patent No.: X8843
(45) Date of Patent: May 29, 1835

(54) POWER, PROPELLING, BY CAMS & INCLINED PLANES

(76) Inventor: Philo C. Curtis

Philo C. Curtis
Letters Patent

The schedule referred to in these Letters Patent and making part of the same containing a description in the words of the said Philo C. Curtis himself of his improvement in the method of applying power to produce an increased velocity by means of cams or inclined planes, arranged circularly around the shaft or wheel to be driven.

To all to whom these presents shall come

Be it known that I Philo C. Curtis of Utica in the County of Oneida and state of New York have invented a new and useful improvement in a method of applying power to produce an increased velocity by means of cams or inclined planes, arranged circularly around the shaft or wheel to be driven and that the following is a full and exact description of the construction and operation of the said machine as invented or improved by me. The first power by which I purpose to set this machine in operation I do not limit to that of horses or animals but contemplate the use of steam, water or any other propelling force and vary the mode of application thereof to the nature of that selected. We take for illustration that of animals — thus a large wheel of any desired dimensions having the circumference shaped to the mode of communication with the machinery to be driven, whether by means of a strap, rope, chain &c is placed horizontally, (as being most convenient) with the lower end of its axis resting in a step or floor beneath, on which it is to revolve. The upper end of it will rise above a floor over the wheel, through which it will pass & where it will turn as in a collar, on the top of the shaft and nearly even with the floor is to be affixed a circular plate or wheel, having a pin or projection standing on the top at such a distance from the the centre of the axis towards the rim of said plate. as will be
thought requisite for sufficient length of leverage to form as it
were a crank by which when turned round, the wheel and shaft
are set in motion, and this I effect by the following contri-
vance. Around this plate or wheel, is raised a circular
band or rim of about the width of the radius of the ~~top~~ plate
& about the same height as the plate from the floor so as to
be smooth or flush with it. This rim is secured to the floor
& fits the plate or wheel sufficiently loose to allow it to
turn freely. At the distance of say about five & a half times
the width of this rim. from the outside thereof is to be secured
on the same floor another rim of somewhat greater height
than the small one, having the inner edge a plain circle. struck
from the centre of the shaft, which will also be the centre of
the small rim, and the outer edge serrated or shaped as
it were somewhat like the teeth of saw. thereby forming
as it were a succession of cams or inclined planes form-
ed at right angles with each other pointing outwards,
like saw teeth | the points whereof are rounded & the inter
sections at the bottom of the teeth likewise for the more easy
passage of a friction roller along the waived line thus presented,
or up-- one side of the tooth & down the other & so alternate-
ly. Within these two rims is to be situated another filling
up the space between them. but it is to revolve in the
same plane & around the smaller one, as a centre, it will
rise a little higher from the floor than the outside serrated
one. having an additional piece or rim fastened to it on
the top, of about the same thickness & extending from the outside
circumference in the direction of the centre of the shaft to about
twice the width of the smallest rim, This piece has a por-
tion of the under side removed at regular intervals, there-
by leaving openings between the top of said rim & the top of
the revolving one beneath for the passage of levers, or axles
extending extending from a plate or flat circular collar in which the crank pin revolves. and to which said levers are attached by means of a joint and pin, all except one (which is made immoveable thereon) unto the outside edge of the toothed rim, where another passes down, through said end. and a friction roller below which is intended to roll along the toothed edge, or succession of planes at angles with each other – & revolving on the pin. Between said roller & the lever, the pin passes through a thin plate of sufficient length to extend along the circumference of the moveable rim. to another piece projecting as an arm or radius therefrom & to which said thin plate is secured at its opposite end by a pin, so as to play on it as a pivot; this projecting arm is situated at a regulated distance from the lever to which it belongs, in the interval between it & the next, of which there are as many as will correspond to the number of levers employed, I find that six levers, form the most convenient & effectual number, and that eighteen teeth to the outside rim form the best combination with a machine of this proportion – also that from the situation or line in which the first lever is placed, the next is to fall back one sixth and so on all round. in order to so proportion the motion that the whole combination will work effectually & easily. A number of levers, either one, two or more by which the horses are to pull, project to a suitable distance from the rim through which the levers pass. The manner in which I laid out the form of the teeth in the outside rim is as follows. I procured another wheel of about the same diameter as the one first described. which I placed by the side of it with a belt connecting these two – above the first mentioned one is to be placed a very small one, on the same axis, with a belt running over the circumference of the moveable rim which being being put in motion by this gearing, a pin being projected from the bottom of one lever, at the outer end, will describe such a form of teeth around the outer rim as will be found best suited to this combined movement. Should the power of Steam be employed, it can be exerted at the end of the horse levers, or should water be used, the situation of the wheel, rims &c will be changed from a horizontal to a vertical position, & the weight of water still exerted on the same point. In the operation of my machine, the power exerted at the horse levers tends to urge forward the moveable rim, this of course draws with it the pieces projecting from it, which are connected by means of the thin plate to the straight levers, consequently they have a tendency to follow the same direction, but in doing so are compelled to follow the inclinations of the outer rim, by means of the friction rollers, so that in mounting the plane, the rising of the lever carries with it by the opposite end, the collar in which is contained the projecting pin forming the crank which thereby sets the shaft & wheel in motion, & this tendency is kept up by the succession of levers as they respectively arrive at the top of the tooth & such is the combination that some are always rising at the points necessary to force the crank round the opposite tooth being in a reversed situation with respect to the opposite lever, which keeps up a continued motion. What I claim as my invention & not previously known in the above described machine is the principle or manner of producing the given effect to the crank, on the shaft & wheel, according to the device or contrivance above set forth, consisting of the inner and outer rims immoveable. The moveable one between them. The arrangement of the collar on the crank pin, joined to the levers working through the moveable rim & attached to the thin plates connecting them with the thin arms or projecting radii.

D [illegible]

secured in said rim. and the manner of adapting the friction
roller to produce the desired effect on the outer rim. or inclined
planes. In Testimony that the above is a full clear and
exact description of the construction & modes of operation of
my machine as invented or improved by me. I have
hereunto set my hand this seventh day of May in the
year eighteen hundred and thirty five.

Witnesses
Henry Stone
B. K. Morsell

Philo C. Curtis

[illegible] (Letter written June 9 1842.)

1507 words]

Exd.
[illegible]